Aug. 27, 1968        J. B. CHAMBERS ETAL        3,398,750
ARTICLE TREATING AND CONVEYING SYSTEM
Filed Feb. 19, 1965                6 Sheets-Sheet 1
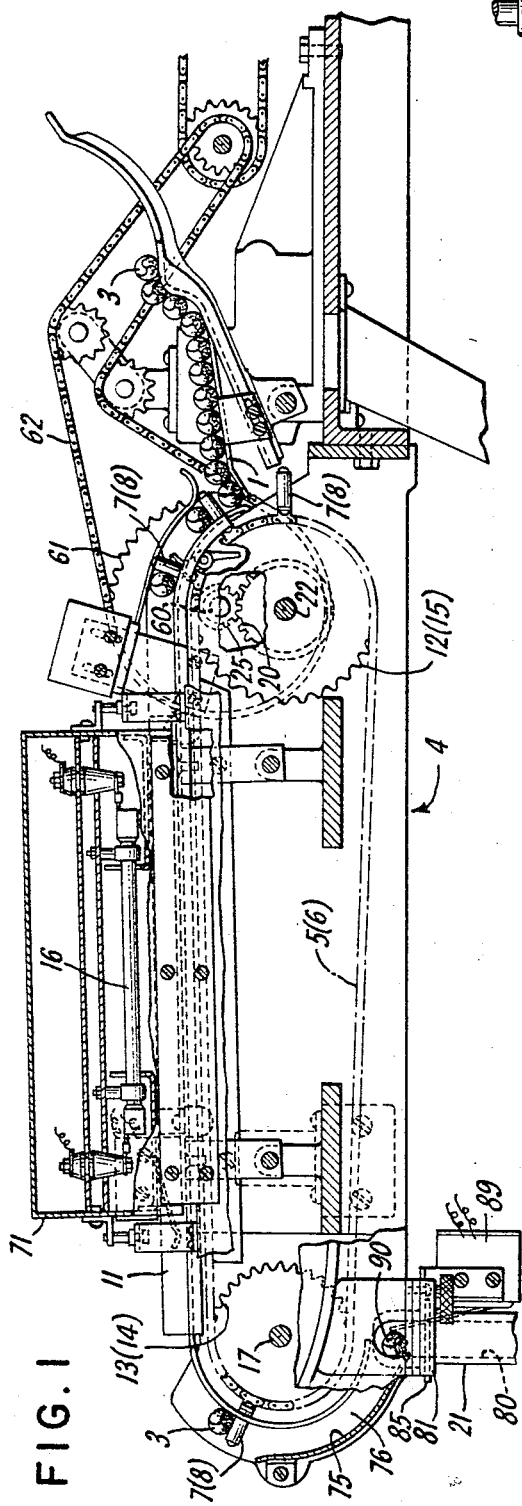
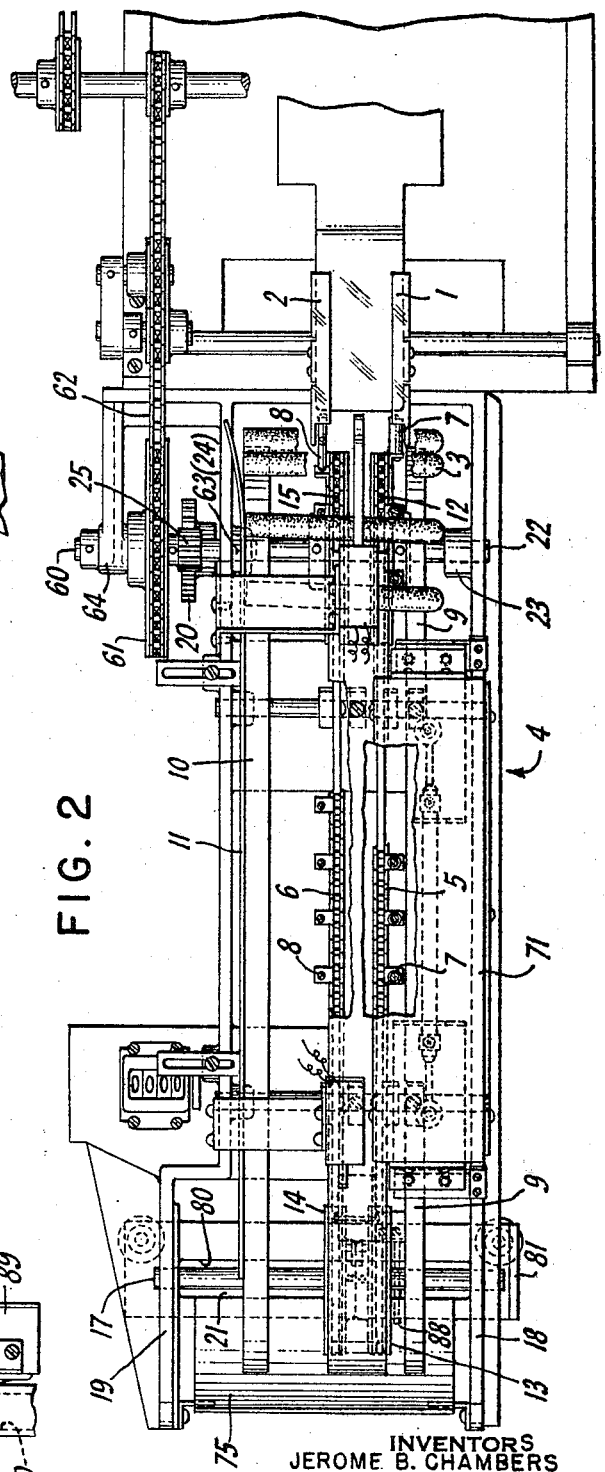
INVENTORS
JEROME B. CHAMBERS
DAVIS D. DINNEY
BY
*John E. Cassidy*
ATTORNEY Aug. 27, 1968  J. B. CHAMBERS ETAL  3,398,750
ARTICLE TREATING AND CONVEYING SYSTEM
Filed Feb. 19, 1965  6 Sheets-Sheet 2

INVENTORS
JEROME B. CHAMBERS
DAVIS D. DINNEY
BY
John E. Cassidy
ATTORNEY

INVENTORS
JEROME B. CHAMBERS
DAVIS D. DINNEY
BY John E. Cassidy
ATTORNEY

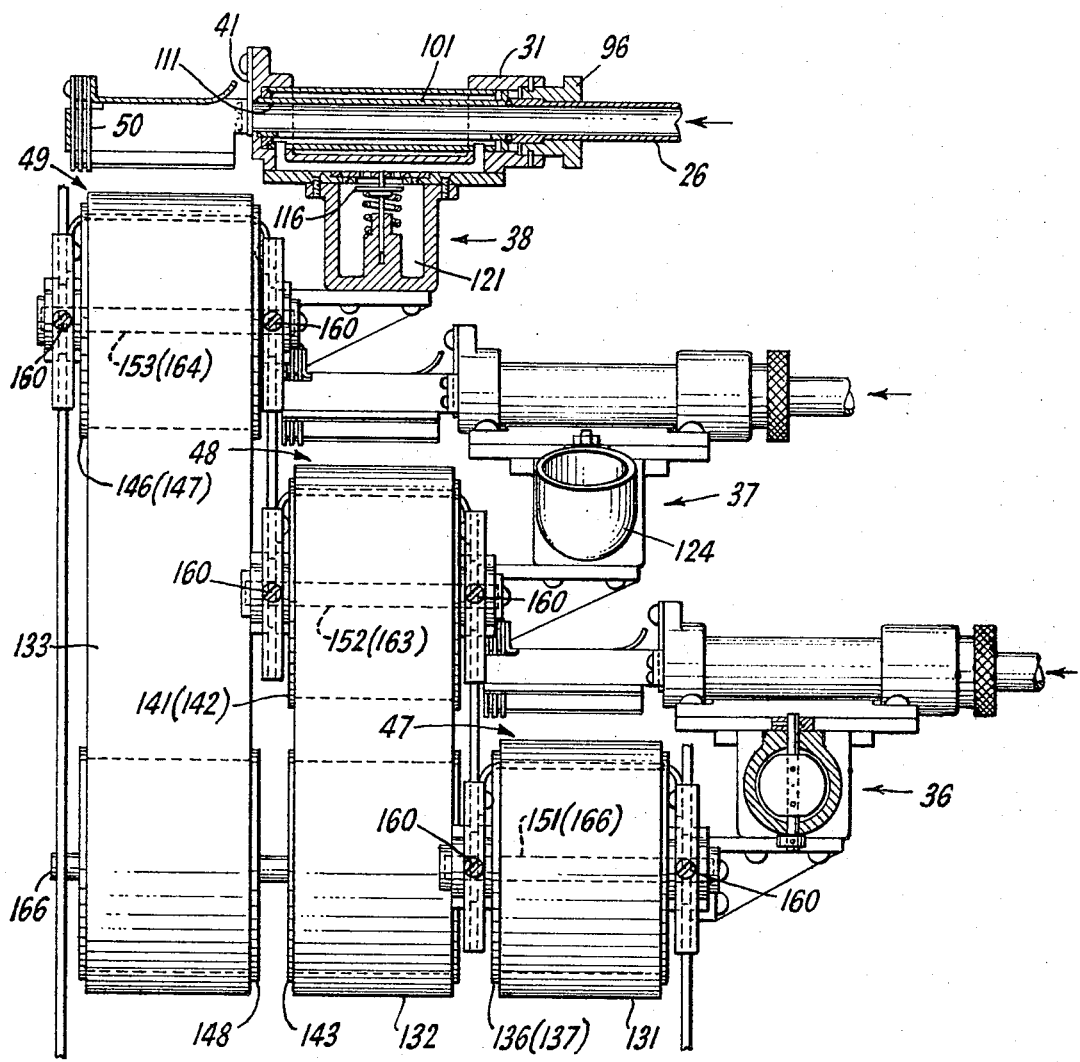

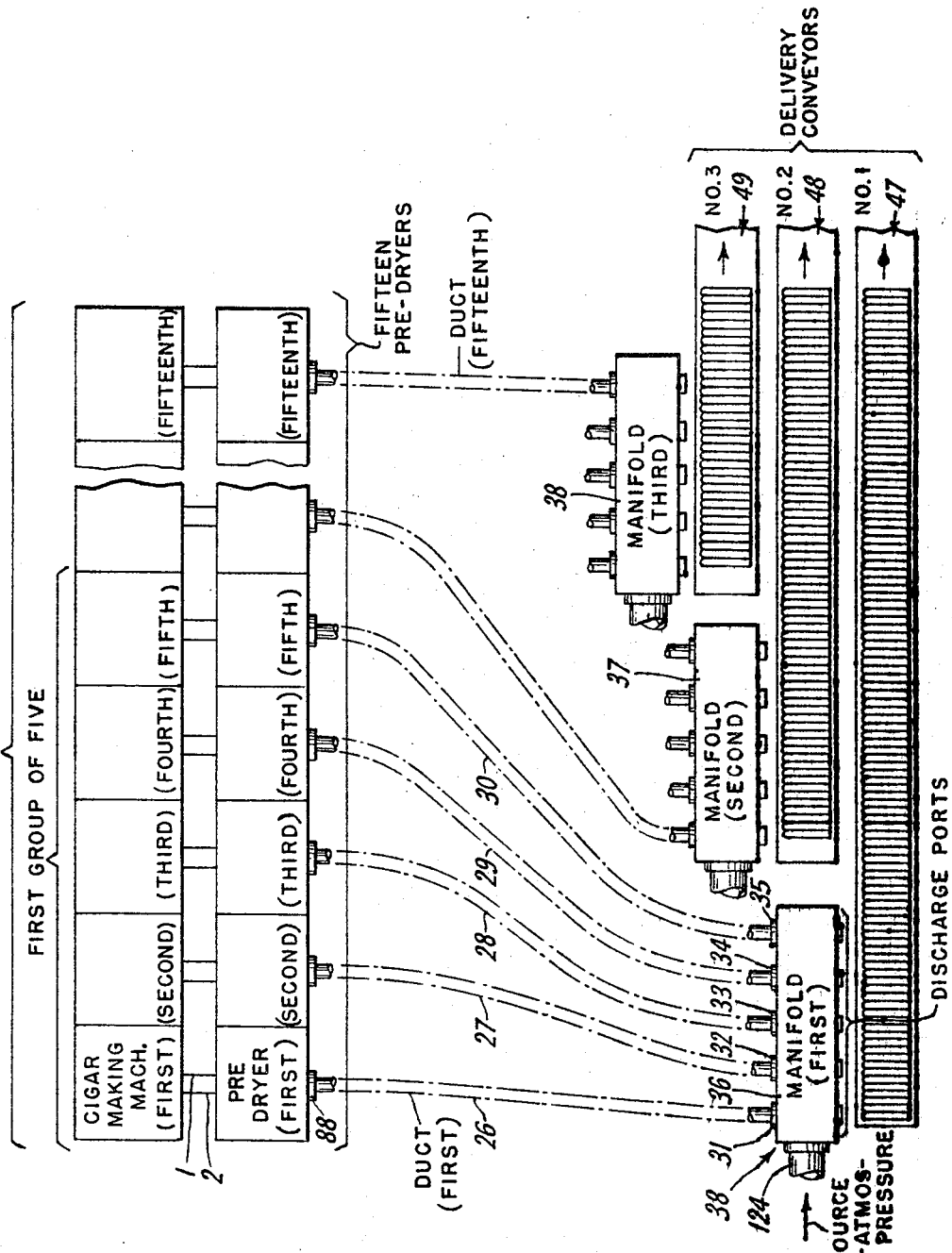

3,398,750
ARTICLE TREATING AND CONVEYING SYSTEM
Jerome B. Chambers, New York, and Davis D. Dinney, Garden City, N.Y., assignors to American Machine & Foundry Company, a corporation of New Jersey
Filed Feb. 19, 1965, Ser. No. 434,065
11 Claims. (Cl. 131—25)

ABSTRACT OF THE DISCLOSURE

Cigar drying apparatus including a conveyor for orienting and transporting cigars, a heater and means for transferring cigars from the dryer to a receiver.

---

This invention, in general, relates to a system for treating or processing and for conveying or guiding an article of manufacture. The invention, in particular, relates to a system for receiving, manipulating, orienting, processing, conveying, and guiding articles of manufacture. In greater particularity, the invention relates to heat treating and conveyor mechanisms for wet pasted cigars produced by cigar making machines. In even greater particularity, the invention relates to a novel system comprising a plurality of concurrently operated cigar making machines and novel instrumentalities for receiving, manipulating, heat treating, and conveying the articles from each cigar making machine of a group of cigar making machines to a respectively corresponding termination in a respectively corresponding one of a plurality of common distributing manifolds, and for distributing the cigars from each of said manifolds to a respectively corresponding one of a plurality of delivery conveyors.

Heretofore, in the manufacture of cigars, the application of wet paste to secure the cigar wrapper to the cigar left the head end of the cigar, the end ordinarily placed in the smoker's mouth, in a wet condition. If the cigars were further processed while the heads were in this wet condition, the cigars tended to adhere to each other, or might adhere to or leave an accretion of paste on the machinery employed in their progress through the finishing and packaging stages. To obviate these hazards, the cigars, after the application of the wrapper, were gathered together in containers wherein they were stored for an interval of time sufficient to permit the wet head ends of the cigars to dry or set. The delay due to the storage interval slowed down production, thus making it difficult to further extend the automation of cigar manufacturing, conveying, processing, and packaging, and to reduce manufacturing costs.

An object of the present invention is to eliminate the storage of the cigars and the accompanying time delay, and to thereby facilitate the automation of cigar manufacturing, conveying, processing, and packaging.

Another object of the invention is to accelerate the drying of the wet paste on the head ends of the cigars.

Still another object of the invention is to further extend the automation of cigar manufacturing.

Still another object of the invention is to operate a plurality of cigar making machines concurrently and to direct the respective cigar outputs thereof to one or more common distributing manifolds.

Still another object of the invention is to provide a plurality of common manifolds for receiving the cigars from a plurality of groups of cigar making machines and for distributing the cigars from each manifold to a respectively corresponding one of a plurality of delivery conveyors.

Still another object of the invention is to reduce manufacturing costs.

A feature of the invention is a predryer comprising a source of radiant heat, e.g., an infrared lamp, for predrying the wet (freshly pasted) heads of the cigars delivered by a cigar making machine.

Another feature of the invention is an elongated support or conveyor for receiving from a cigar making machine the transversely disposed cigars with wet heads, having a cigar propelling mechanism, traveling beneath and in proximity to an infrared lamp for exposing the wet heads of the moving cigars to radiant heat to effect the predrying thereof.

Still another feature of the invention is a mechanism for imparting a rolling motion to the cigars transversely disposed on the support or conveyor, causing the cigars to rotate axially as they are moved along the length of the infrared lamp, to effect faster and more uniform predrying of the wet heads of the cigars.

Still another feature of the invention is a mechanism for orienting the cigars as they leave the support or conveyor of the predryer so that, for example, the head ends, of the cigars are in rear of their tuck ends (lightable ends).

Still another feature of the invention is a flat delta-shaped funnel for receiving and maintaining the cigars in the predetermined orientation, in the present case with their tuck ends in the advanced position, as they leave the support conveyor of the predryer.

Still another feature of the invention is a conveyor duct connected at one end to the small end of the delta-shaped funnel, to receive cigars therefrom, and connected at its other end to a source of subatmospheric fluid pressure. Thus, the flow of the fluid, e.g., air, through the duct propels the cigars through the duct toward their point of discharge.

Still another feature of the invention is the provision of apparatus to facilitate the concurrent operation of a plurality of groups of predryer-equipped cigar making machines, wherein the output of each machine is respectively connected to one end of a conveyor duct individual thereto, and the other end of each of the ducts is individually connected to its respectively corresponding termination in that one of a plurality of distributing manifolds which respectively corresponds to the group in which the machine is situated, whereby the cigar outputs of each group of cigar making machines are combined, and the combined outputs of each such group are distributed to its respectively corresponding one of a plurality of delivery conveyors.

Still another feature of the invention is a multistation distributing manifold positioned over a delivery conveyor, and comprising a plurality of pneumatic conveyor duct terminations each of which is individually associated with a port or nozzle having a normally closed cigar-actuable flap-valve, and each of which terminations affords access to a manifold chamber in communication with a source of subatmospheric pressure, wherein one such termination and its associated port or nozzle is provided for each machine of an associated group of cigar making machines, and whereby the cigars produced by each of the groups of cigar making machines are combined in their respectively associated manifolds, are ejected through their respective ports and flap-valves, are decelerated by the admission of ambient air by the operation of the flap-valve, and are distributed to the delivery conveyor positioned therebelow.

Still another feature of the invention is a cigar guiding and positioning structure within the distributing manifold for causing the decelerated cigars as they are discharged from the manifold, to have their longitudinal motion arrested by a resilient bumper, and to be distributed onto a delivery conveyor in a spaced parallel relationship, transverse to the motion of the conveyor, and with the head ends of the cigars pointed in the same direction.

Still another feature of the invention is the provision of apparatus to facilitate the concurrent operation of a plurality of distributing manifolds, each manifold being arranged to receive the combined cigar outputs of a plurality of cigar making machines, and each manifold being respectively positioned above one of a plurality of delivery conveyors arranged to receive the cigars as they are discharged thereupon from the manifolds.

Still another feature of the invention is the provision of apparatus to facilitate the concurrent operation of a plurality of delivery conveyors, each conveyor being respectively positioned below one of a plurality of distributing manifolds and being arranged to receive therefrom the combined outputs of a respectively corresponding plurality of cigar making machines.

The above, and other, objects and features will be evident from the accompanying drawings in which:

FIG. 1 is a side elevation of a cigar heat-treating conveyor structure;

FIG. 2 is a plan view of the same;

FIG. 7 is an end elevation of the same and shows the resilient bumpers that arrest the longitudinal motion of the cigars as they are discharged onto the conveyors; and FIG. 8 is a schematic diagram illustrating an exemplary arrangement comprising fifteen concurrently operating predryer-equipped cigar making machines feeding their outputs into three distributing manifolds, each of which manifolds distributes the cigars onto its respectively related delivery conveyor.

It is to be understood that where the same part or element of the machine appears in more than one of the figures of the drawings it will carry the same identifying designation throughout.

*General description*

To facilitate an understanding of the invention, the system for treating and conveying articles will first be described in very general terms.

An exemplary embodiment of the system, in essence, comprises a plurality of concurrently operated predryer-equipped cigar making machines, a plurality of conveyor ducts, one for each machine, a plurality of distributing manifolds, one for each group of machines, and a plurality of delivery conveyors, one for each distributing manifold.

Referring to FIGS. 1 and 2, the cigar making machine (not shown) delivers cigars to the delivery rails 1 and 2. The cigar making machine is one of a plurality of such machine, 15, for example, and may be of the type disclosed in U.S. Patent 3,033,210, issued to S. Clausen et al., May 8, 1962. The cigars, as placed upon the delivery rails 1 and 2, are freshly pasted and, therefore, the paste on the head end of the cigars is still wet. Further handling of the cigars while in this wet state is impractical because of their tendency to adhere to each other, or to adhere to, or to deposit an accretion of paste onto the machines employed in subsequent stages. The instant invention overcomes this difficulty by providing a means for predrying the heads of the freshly pasted cigars.

Figure 4:
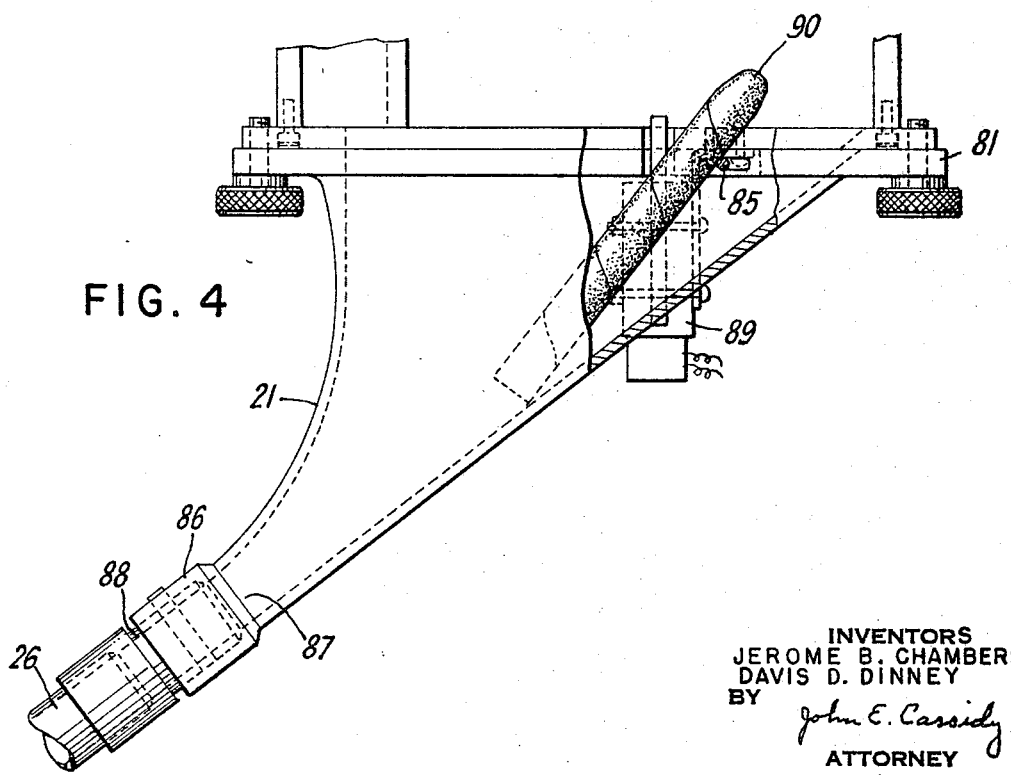
FIG. 4 is an end elevation of the funnel for orienting and receiving the cigars from the conveyor and for directing the cigars into a pneumatic conveyor duct.

Referring to FIGS. 1, 2 and 4, the freshly pasted cigars, e.g., 3, when placed on the delivery rails 1 and 2 are positioned so that corresponding ends are all pointed in the same direction. The cigars are received from the delivery rails 1 and 2 by the conveyor 4. The conveyor comprises two continuous chains 5 and 6, parallel to each other and provided with a cigar pushing or spacing means, e.g., 7 and 8, supporting rails 9 and 10 on which the cigars are supported above the chains and transversely to the direction of travel of the conveyor, and a guide rail 11 for aligning the tuck ends of the cigars. Positioned above the conveyor 4 and in proximity thereto is an infrared lamp 16 for furnishing radiant heat to accelerate the drying of the wet paste on the head ends of the cigars. As the cigars traverse the length of the conveyor, a rolling or axial rotary motion is imparted to the cigars, causing the wet head ends of the cigars to be uniformly exposed to the infrared rays to effect faster and more uniform predrying.

As the cigars leave the conveyor 4, they enter a flat delta-shaped funnel 21, FIG. 4. On entering the funnel they are oriented so that, for example, the tuck ends are in advance of their head ends. Connected to the small end of the funnel 21 is a conveyor duct or tube 26. The duct is one of a plurality of such ducts, one being provided for each cigar making machine. The cigar making machines are resolved into groups, for example, three groups to five.

Figure 5:
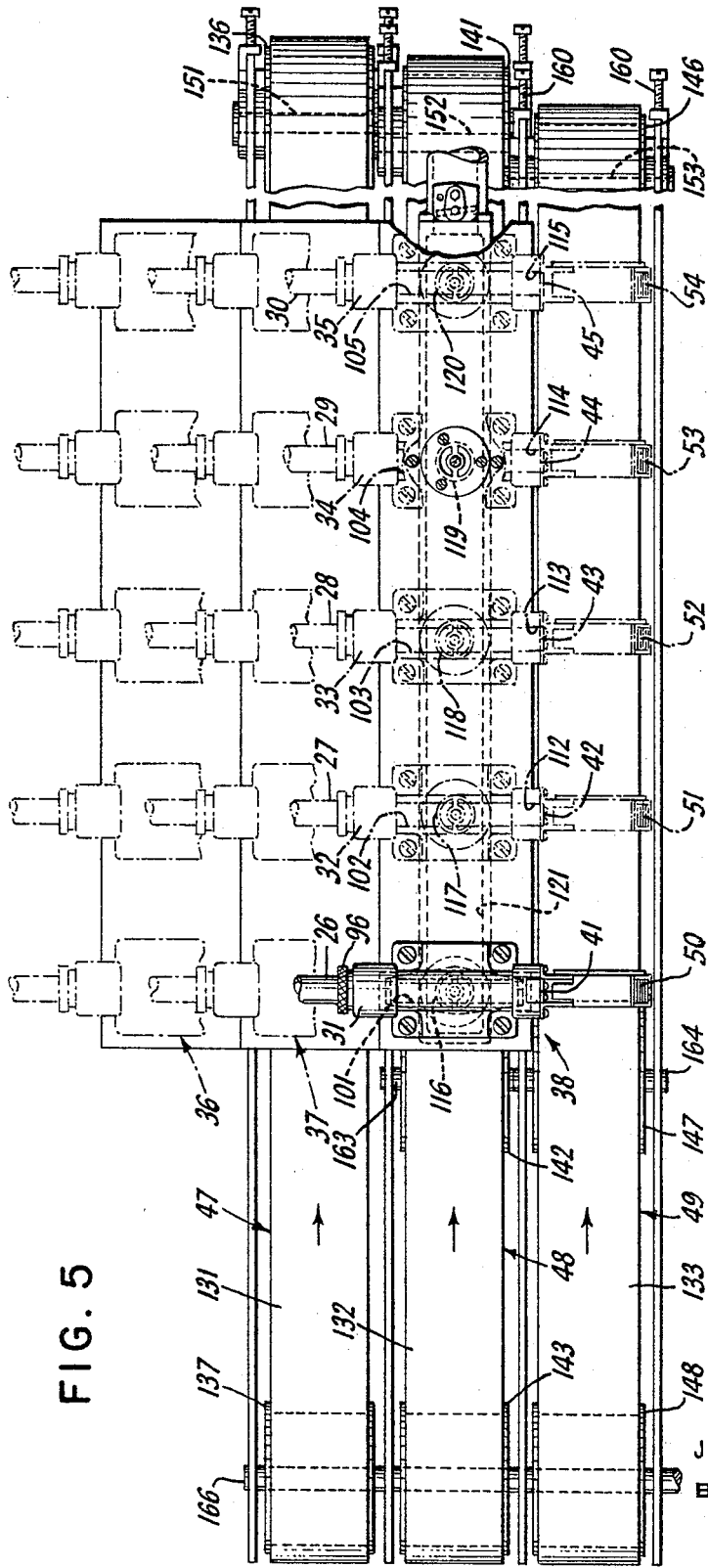
FIG. 5 is a plan view of a plurality of distributing manifolds for receiving the cigars from the pneumatic conveyor ducts and for decelerating the cigars and distributing them onto a delivery conveyor.
Figure 6:
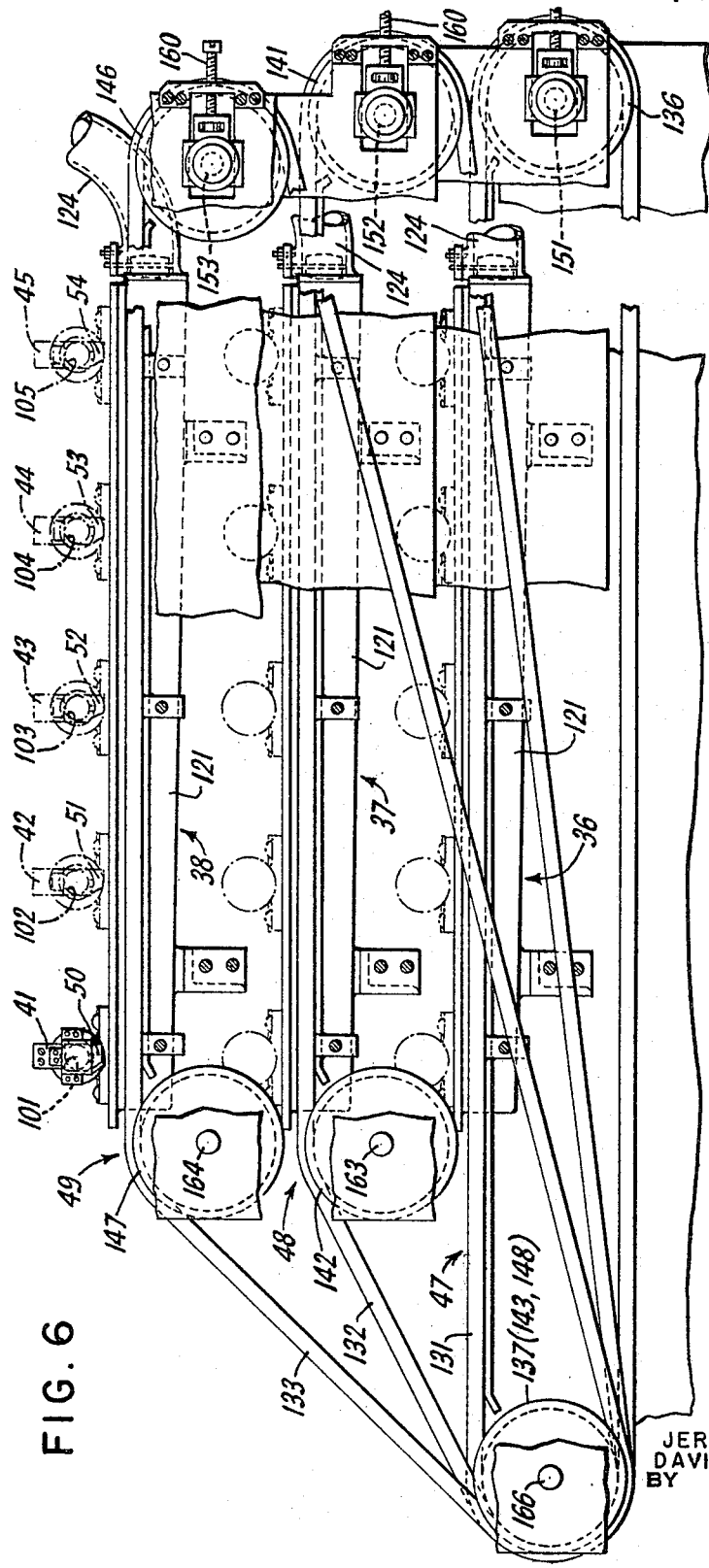
FIG. 6 is a side elevation of the same.

Referring now to FIGS. 4, 5 and 6, the end of duct 26 remote from that shown in FIG. 4 is connected to a particular termination, e.g., termination 31, of a plurality of duct terminations in a particular manifold, e.g., manifold 36, which is one of a plurality of, three, for example, distributing manifolds. All of the manifolds are connected to a source of subatmospheric pressure. The ducts from the other cigar making machines are similarly connected to their respective terminations in other distributing manifolds, as diagrammatically illustrated in FIG. 8.

Each distributing manifold is provided with a plurality, 5, for example, of duct terminations, each such termination being respectively connected to the duct from a particular cigar making machine forming part of a particular group (FIG. 8), to receive the cigar output therefrom. Thus, each such distributing manifold receives the combined cigar outputs from its respectively related group of cigar making machines, decelerates the cigars by means of the cigar-operated flap valves, e.g., 41, FIGS. 5 and 6, and discharges the cigars, properly oriented, against the resilient bumper members, e.g., 50, which arrests the longitudinal motion, and permits the cigars to fall upon the respectively related ones of a plurality of delivery conveyors positioned therebelow.

Referring now to FIG. 8, there is one delivery conveyor for each distributing manifold and, since each distributing manifold receives the combined outputs of a particular group of five cigar making machines, the first delivery conveyor 47 receives the combined cigar outputs of a first group of cigar making machines, the second conveyor 48 receives the combined cigar outputs of a second group of machines, and the third conveyor 49 receives the combined outputs of a third group. As the cigars emerge from the distributing manifold they are placed upon the delivery conveyors in a spaced parallel relationship transversely to the direction of the conveyor motion.

The above described arrangement permits the steady delivery of a large quantity of predried cigars to the succeeding high speed cigar processing and packaging machines. Thus the succeeding machines are provided with a work load sufficient to permit them to be operated at their optimum speeds, thereby effecting an economy in machine use.

The disclosure in the Clausen patent hereinabove referred to is incorporated herein by reference as a part of the present specification.

*Detailed description*

Heretofore, cigars manufactured by conventional methods have been required to be stored for a length of time sufficient for the wet paste in the head ends thereof to dry or set. If cigars were processed while the paste was still wet, the cigars tended to adhere to each other or to the conveying, processing and packaging machinery, or to deposit troublesome accretions of paste onto such machinery.

The present invention overcomes the above difficulties by providing a new and improved mechanism for heat-treating cigars as they are received from an automatic cigar making machine, to thereby dry or set the plaste on the wet heads of the cigars, and to thus enable the cigars to be expeditiously conveyed, guided, distributed, processed, and packaged.

The conveyor

Referring now to FIGS. 1 and 2, the freshly pasted cigars, e.g., 3, from a conventional cigar making machine (not shown), are received on the inclined delivery rails 1 and 2. The conveyor structure 4 comprises two continuous chains 5 and 6. Chain 5 is carried by front sprockets 12 and 13. Similarly, chain 6 is carried by rear sprockets 14 and 15. The left-hand sprockets 13 and 15 are supported by idler shaft 17 rotating in bearings 18 and 19. The right-hand sprockets 12 and 14 are supported and driven by drive shaft 22 rotating in bearings 23 and 24. The left-hand sprockets 13 and 15, and the right-hand sprockets 12 and 14 are longitudinally adjustable in the shafts 17 and 22, respectively, to permit the spacing between chains 5 and 6 to be adjusted to adapt the conveyor for use with cigars of different lengths. Secured to drive shaft 22 is a gear 20 meshing with a smaller gear 25. The gear 25 is, in turn, secured to the machine drive shaft 60. Also secured to shaft 60 is the machine drive shaft 61. Shaft 60 rotates in bearings 63 and 64. Sprocket 61 is linked by a drive chain 62 to a cigar making machine (not shown), thus ensuring that the conveyor mechanism of the instant invention will be driven in synchronism with the cigar making machine.

The front and rear conveyor chains 4 and 5, respectively, have secured thereto the equally spaced and transversely aligned sets of front and rear cigar pushers, e.g., 7 and 8, respectively. The spacers therebetween are sufficient to permit the free movement of cigars. The cigar supporting rails 9 and 10, each rail comprising a substantially straight horizontal portion and an arcuate portion at either end, are adapted to support and to facilitate the axial rotation thereon of the freshly pasted cigars as they are moved through the conveyor by the action of the cigar pushers, e.g., 7 and 8. The front supporting rail 9 is preferably of circular cross-section, to minimize the area presented to the wet pasted head ends of the cigars, and to thereby reduce the accretions of paste on the front supporting rail. Both of the rails 9 and 10 are, preferably, made of a substantially noncorrosive material, such, for example, as stainless steel, to minimize wear and to expedite cleaning and maintenance. To increase the coefficient of friction between the cigars and the supporting rails 9 and 10, and to ensure that the cigars will roll thereon, and not merely slip, the surface of the rails 9 and 10, if desired, may be roughened slightly, for example, by sand blasting. The guide rail 11 is integral with the rear supporting rail 10 and comprises a substantially vertical blade for aligning the tuck ends of the cigars as they are moved along the supporting rails 9 and 10. In the exemplary disclosure, it will be observed that the front cigar pusher 7 is of larger diameter than the transversely aligned rear cigar pusher 8. This is to impart a slight leftward cant to the head ends of the cigars as they are being rotatably moved along the supporting rails, thereby causing the tuck ends of the cigars to veer toward and align themselves with the vertical surface of the guide rail 11.

The preheater

Figure 3:
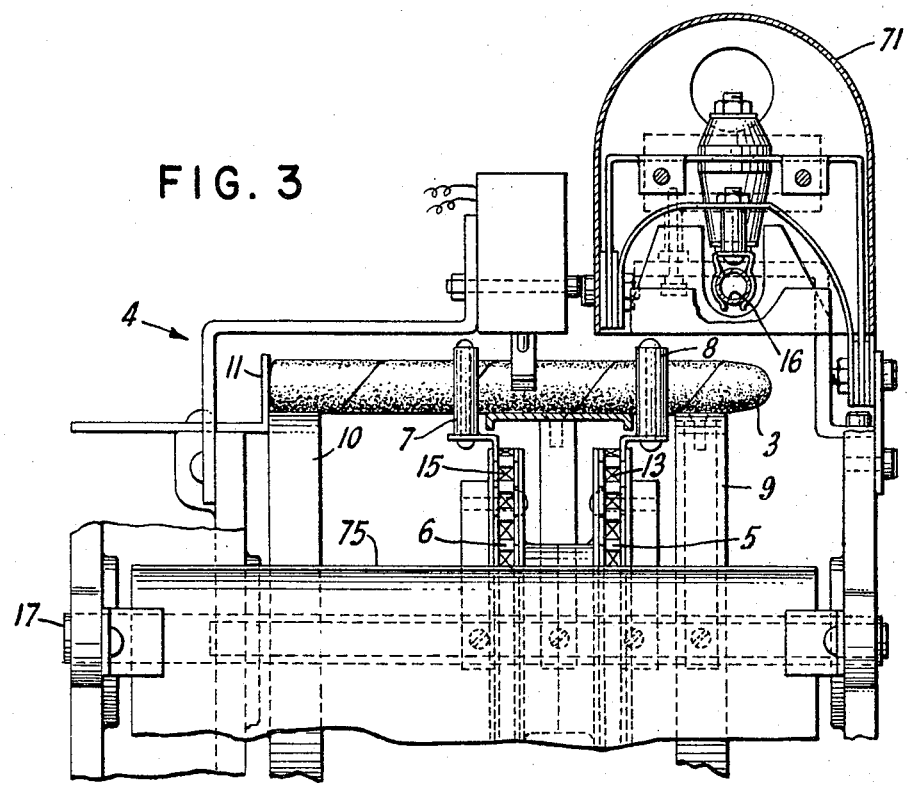
FIG. 3 is an end elevation of the lamp and lamp housing.

Referring now to FIGS. 1, 2 and 3, FIG. 3 shows an elongated tubular preheater lamp 16 which, in the exemplary disclosure, is an infrared lamp. The longitudinal axis of lamp 16 is substantially parallel to the supporting rails 9 and 10, and is mounted above and in proximity thereto. The lamp 16 is enclosed in lamp housing 71 provided with suitable ventilating means to reduce the surface temperature of the lamp tube to increase its useful life, to reduce the temperature of the lamp housing to minimize operating hazards, and to introduce a fresh air supply over the cigars on the conveyor to rid the ambient air of excessive moisture produced by the evaporation of moisture from the cigars as they move along the conveyor.

Cigar orientation

Referring now to FIGS. 1, 2 and 4, as hereinabove described, the supporting rails 9 and 10 each have an arcuate continuation extending from their left-hand ends. These continuations are substantially semicircular and are concentric with the shaft 17. Also concentric with shaft 17 is an arcuate guiding surface 75, suitably spaced from the supporting rail continuations and forming a quandrant-shaped guiding cigar passageway 76. At the bottom of the passageway 76, and tangent thereto, is an elongated cigar slot or orifice 80, the length of which is transverse to the direction of conveyor travel and parallel to the cigars being propelled along said conveyor. The dimensions of slot 80 are adapted to permit the free and unimpeded passage of cigars therethrough as they leave passageway 76. Positioned beneath and aligned with slot 80 is an elongated aperture 81, constituting the large end of a flat delta-shaped funnel 21. The dimensions of aperture 81 are substantially coextensive with those of slot 80. Adjustably positioned in aperture 81, at or near the top of the large end of funnel 21, is the cigar-orienting fulcrum rod 85. As shown in the exemplary disclosure, fulcrum rod 85 is so positioned as to be in the path of a cigar passing through slot 80, and to make contact with the cigar at a point between its center and its head end. The cigar, in falling, will tend to rotate about fulcrum rod 85, thereby causing the blunt or tuck end of the cigar to precede the head end as it enters the constricted portion of the funnel 21. The inside width of funnel 21, that is transverse the direction of motion of the conveyor, is substantially the same as the width of the funnel aperture 81, throughout the length of the funnel. It is obvious from reference to FIG. 4 that if the fulcrum point 85 were to be shifted toward the left-side of the funnel, so as to make contact with a falling cigar at a point between its center and its tuck end, the cigar would then tend to rotate about fulcrum point 85 in the opposite direction, thereby causing the head end of the cigar to precede the blunt end as it enters the constricted portion of funnel 21. The small end 86 of funnel 21 has therein a circular orifice 87 having an internal bore or diameter substantially equal to the width of aperture 81 at the large end of funnel 21. Orifice 87 is adapted to receive a duct coupling member 88, terminating and secured to one end of a flexible pneumatic conveyor duct or hose 26. The duct 26 also has an internal bore or diameter substantially equal to the width of aperture 81 at the large end of the funnel 21.

Pneumatic conveyors

The duct 21 is one of a plurality of such ducts, as illustrated in FIG. 8, one such duct being provided and respectively connected to each of a plurality of funnels such as 21, where each such funnel receives the output of its respectively associated heat treating conveyor, such as 4. All of the ducts, such as 26, are connected, as will be hereinafter described in detail, to a source of subatmospheric fluid pressure or vacuum to propel the cigars through the ducts. It is desirable that the inside diameter or bore of the ducts be sufficient to permit the cigars to be freely propelled therethrough by fluid pressure or suction; but if the internal diameter of the ducts be too

"Jam" switch

In each of the funnels, such as 21, at or near its large end, as best seen in FIGS. 1 and 4, a microswitch (or "jam" switch) 89 is provided. This switch is arranged so that in the event that a stoppage in the pneumatic duct should result in piling up or jamming of the cigars in the funnel, a cigar, e.g., 90, protruding upwardly and into the path of the cigars being propelled through passageway 76, would be pushed into contact with the microswitch 89, causing the switch to be actuated. Microswitch 89 may be employed in a circuit (not shown) for opening the power supply circuit to the drive motor for the cigar making machine (not shown).

Distributing manifolds

Referring to FIGS. 5, 6 and 7, the end of pneumatic conveyor duct 26 remote from the conveyor and heater is connected to duct termination 31 by means of a coupling member 96, connecting the pneumatic duct 26 with the longitudinally slotted tube 101 which terminates in the discharge port or nozzle 111, best shown in FIG. 7. The duct termination 31 is one of a plurality of such terminations in one of a plurality of common distributing manifolds, e.g., 36 in FIGS. 7 and 8. In the exemplary disclosure, three such distributing manifolds, 36, 37 and 38, respectively, are employed. The manifolds are placed one above the other, and, also, are offset with respect to each other, but otherwise are substantially identical. Each manifold is provided with five duct terminations, the manifold 36, for example (the lowermost), having duct terminations 31, 32, 33, 34 and 35 connected to conveyor ducts 26, 27, 28, 29 and 30, respectively. Each of the conveyor ducts is connected at its heater-conveyor end to receive the output of its respectively associated one of a plurality of cigar making machine, as illustrated in FIG. 8.

The other duct terminations 32, 33, 34 and 35 of distributing manifold 36 are respectively connected to slotted tubes 102, 103, 104 and 105, FIGS. 5 and 6, which, in turn, respectively terminate in the discharge ports or nozzles 112, 113, 114 and 115, FIG. 5. The slotted portions of slotted tubes 101, 102, 103, 104, and 105 are enclosed within the suction of vacuum chamber 121 of the distributing manifold 36 which, in turn, is connected by a suction duct 124 to a source (not shown) of sub-atmospheric fluid pressure. Thus, all of the pneumatic conveyor ducts 26, etc., by means of the slotted tubes 101, etc., are in communication with a source of suction for propelling the cigars from the small end of the funnel, e.g., 21, to and through the ports or nozzle 111, etc. The inside diameter or bore of the slotted tubes 101, etc., is substantially the same as that of pneumatic ducts 26, etc. Each of the discharge ports or nozzles 111, 112, 113, 114, and 115, respectively, is closed to the ambient atmosphere by means of a one-way flap valve 41, 42, 43, 44 and 45. These flap-valves may be made of a light flexible material, or they may be made in the form of a hinged plate or any other suitable valve construction may be employed which is actuable to open the valve and to admit ambient air by the momentum of a cigar as it emerges from the nozzle, e.g., 111.

Each of the distributing manifolds, e.g., 36 is provided with a plurality of individually adjustable throttle valves or chokes 116, 117, 118, 119 and 120, FIGS. 5 and 7, positioned in the wall of the vacuum chamber, e.g., 121, and in proximity to the slotted tubes 101, 102, 103, 104 and 105, respectively. Each such throttle valve permits the individual adjustment of the degree of "bleeding" of ambient air through the pneumatic ducts 26, etc., out through the slotted tubes 101 through 105 and into the distributing manifold, 36, etc. Thus, by a suitable individual adjustment of the throttle valves or chokes 116, etc., it is possible to compensate for variations in length, leakage, friction, etc., in the several ducts connected to the distributing manifolds. Also, such individually adjustable throttle valves, when properly adjusted, prevent loss in vacuum in the event that a relatively large number of flap-valves should be concurrently opened. Or, in the event that the pneumatic ducts should be disconnected from the manifold for any reason, e.g., cleaning. This has the effect of making the continued operation of any one duct independent of the condition of the other ducts on the common manifold. Each of the discharge ports or nozzles 111, 112, 113, 114 and 115 has in axial alignment therewith a resilient bumper 50, 51, 52, 53 and 54, respectively. The resilient bumper 50 through 54 are axially spaced from their respectively aligned flap-valves by a distance substantially greater than the length of a cigar and are in substantially horizontal alignment with each other.

Delivery conveyors

For each of the distributing manifolds, e.g., 36, the set of resilient bumpers, e.g., 50 through 54, are positioned above and in proximity to its respectively related one of a plurality of delivery conveyors, e.g., 47. Thus, the lowermost distributing manifold 36 is operatively related to delivery conveyor 47; the middle distributing manifold 37 is operatively related to delivery conveyor 48; and the uppermost distributing manifold 38 is operatively related to delivery conveyor 49. Each of the endless belts 131, 132, and 133 of conveyors 47, 48 and 49, respectively, is provided with a plurality of transverse pockets, each pocket being adapted to receive a cigar.

The endless belt 131, of the lowermost delivery conveyor 36, is carried by pulleys 136, and 137. Endless belt 132, of the middle delivery conveyor 48, is carried by pulleys 141, 142 and 143. Similarly, endless belt 133, of uppermost delivery conveyor 49, is carried by pulleys 146, 147 and 148. Pulleys 136, 141 and 146 are mounted on shafts 151, 152 and 153, respectively, which shafts rotate in bearings 156, 157 and 158, respectively; and all of the bearings are provided with belt tension adjusting mountings, e.g., 160. The pulleys 142 and 147 are mounted on shaft 163 and 164, respectively. The pulleys 137, 143 and 148 are mounted on shaft 166, and may be driven by any suitable means (not shown). Each of the belts 131, 132, and 133, at or near its point of common support upon shaft 166, is in juxta position to a respectively corresponding conveyor prolongation thereof adapted to receive cigars from its respectively corresponding one of belts 131, 132 and 133, and to convey them to the next processing stage.

Résumé of process

Referring again to FIGS. 1–4 and 8, cigars are produced by a plurality of cigar making machines (not shown), and as the freshly pasted cigars, e.g., 3, leave the cigar making machine they roll down the inclined delivery rails 1 and 2 of a predryer conveyor 4, with their head or wet ends toward the front of the predryer conveyor 4. As each cigar reaches the lower end of the inclined rails 1 and 2, it rolls onto a pair of cigar pushers, e.g. 7 and 8, which lift it upward, in a counter-clockwise direction, to the supporting rails 9 and 10, and push it leftwardly therealong in a path immediately below the infrared lamp 16.

As the cigars are successively received and pushed along the supporting rails 9 and 10, a rolling or axial rotary motion is imparted to the cigars, to more uniformly present the wet heads thereof to the drying effect of the infrared lamp. Due to the slightly larger diameter of the front cigar pusher 7, the tuck ends of the cigars veer toward and are kept in alignment with the guide rail 11.

As the cigars complete their traversal of the horizontal portion of the supporting rails 9 and 10, the cigars, which have been dried by their exposure to the infrared lamp, are no longer pushed by the cigar pushers, but each cigar, as it passes the point of tangency, rolls over and is supported by the next pair of pushers to its left, until it has traversed approximately half a circle. At this time, the cigar is free to drop through the elongated slot 80 into the large end 81 of funnel 21 or it may be pushed rightwardly by the cigar pushers by which it was originally pushed until it does drop.

As each successive cigar drops through the slot 80, it collides with adjustable fulcrum rod 85 and rotates thereabout to cause, in the exemplary disclosure, the tuck end thereof to be in advance of the head end, and in this position to drop through funnel 21 and to pass through orifice 87 at the small end of the funnel. As the cigars successively pass through orifice 87 they enter the pneumatic duct 26, which as hereinbefore explained, is one of a plurality of such ducts, there being one duct individual to each predryer-equipped cigar making machine (FIG. 8).

Referring now to FIGS. 5 through 8, each of the pneumatic ducts, e.g., 26, is connected at its other end to one of a plurality of terminations, e.g., 31, in one of a plurality of distributing manifolds, e.g., 36 in communication with a source of subatmospheric pressure. The cigars are propelled through the pneumatic ducts, e.g., 26 through the distributing manifolds, e.g. 36, and are ejected through a respectively corresponding nozzle e.g., 111, and in being ejected open the decelerating flap-valves, e.g., 41, and are finally arrested by colliding with their respectively corresponding resilient-bumper, e.g., 50, whence they drop onto their respectively corresponding conveyor belts, e.g., 131, and thence they are conveyed to the next succeeding operation for process.

Thus the freshly pasted cigars from a plurality of groups of cigar making machines are predried, pneumatically conveyed to their respectively corresponding termination one of a plurality of common distributing manifolds respectively corresponding to said groups of machines, ejected from said machine terminations to their respectively corresponding one of a plurality of delivery conveyors, and conveyed to the next succeeding operation or process.

It is to be understood that the invention is not to be limited to the specific embodiment of the invention shown in the drawings and described herein, but is capable of such modification, substitution of parts, components and elements as would occur to one skilled in the art without departing from the spirit of the invention and the scope of the appended claims.

What is claimed is:

1. In an article treating and conveying system in combination: a connection to a source of articles to be treated; a conveyor means for receiving, supporting, manipulating and moving said articles; a source of radiant energy positioned in proximity to said conveyor means for imparting radiant energy to heat treat said articles being moved by said conveyor means, orienting means situated at the point where the said heat treated articles leave the said conveyor means for suitably orienting said heat treated articles, a conveyor duct connected at one end to said orienting means to receive said heat treated and oriented articles therefrom; a duct termination means having an inlet and an outlet end and said inlet end connected to the other end of said conveyor duct, said duct termination means being in communication with a source of subatmospheric pressure for propelling said heat treated articles through said duct; ejecting means provided in said outlet end for said heat treated articles, decelerating means positioned at said outlet end for said heat treated articles, arresting means spaced outwardly from said outlet end for said heat treated articles, and a delivery conveyor means positioned adjacent said outlet end for receiving and delivering said heat treated articles after contact with said arresting means.

2. In an article treating and conveying system according to claim 1, wherein said source of articles to be treated is a machine for making cigars whose freshly pasted heads are wet and for delivering said cigars to said conveyor means with the heads of said cigars all pointing in the same direction.

3. In an article treating and conveying system according to claim 1, wherein said conveyor means comprises an elongated structure having a receiving point at one end and a delivery point at the other end, a continuous moving chain adapted to receive said articles in parallel spaced relationship to each other at the said receiving point and transversely disposed to the direction of said motion of said chain, means for imparting to said articles an axial rolling motion upon said conveyor means for rotatively moving said articles past and for uniformly exposing them to said source of radiant energy, means for moving said articles to said delivery point at said other end of said conveyor means, means for delivering said articles from said conveyor means, means for supporting said chain, and means for driving said chain.

4. In an article treating and conveying system according to claim 1, wherein said source of radiant-energy is an infrared lamp positioned above and in proximity to said conveyor means for heating said articles being moved past said source of radiant energy.

5. In an article treating and conveying system according to claim 1, wherein said orienting means comprises a flat, delta-shaped funnel having a large end adapted to receive elongated articles from said conveyor means, where one end of said elongated articles is characterized as the head end, a fulcrum member positioned in said large end of said funnel for coacting with and for orienting said elongated articles so that the said head ends thereof are in a preferred position as they move through said funnel, and said funnel having a small end with an opening adapted to permit the free passage therethrough of said elongated articles.

6. In an article treating and conveying system according to claim 1, wherein said termination comprises a perforated tube in communication with said source of subatmospheric pressure for receiving said propelled heat treated articles from said duct.

7. In an article treating and conveying system according to claim 1, wherein said ejecting means comprises a nozzle in alignment and in communication with said guiding means and with said termination for ejecting said heat treated articles propelled through said duct and said guiding means.

8. In an article treating and conveying system according to claim 1, wherein said decelerating means comprises a normally closed flap-valve closing said ejecting means and adapted to be opened by the ejection of said heat treated articles through said ejecting means to admit ambient air through said ejecting means to decelerate said article.

9. In an article treating and conveying system according to claim 1, wherein said arresting means comprises a resilient shock absorbing means in axial alignment with said ejecting means and suitably axially spaced therefrom for arresting the motion of said heat treated articles propelled through said duct, said termination, said guiding means, said ejecting means and said decelerating means.

10. In an article treating and conveying system according to claim 1, wherein said delivery conveyor means comprises a suitably supported endless belt in proximity to said ejecting means and to said arresting means and having transversely disposed pockets adapted to receive and deliver said ejected heat treated articles.

11. In a cigar treating and conveying system in combination:
  (a) a plurality of groups of concurrently operated cigar making machines for supplying freshly pasted cigars;
  (b) a plurality of groups of concurrently operated cigar conveyor machines, each having:

(c) a receiving point individually connected to a respectively related cigar making machine for receiving freshly pasted cigars therefrom, (d) a delivery point for unloading said cigars from said conveyor machine;

(e) a conveyor means for receiving, supporting, axially rotating and moving said cigars toward said delivery point;

(f) a source of radiant energy positioned adjacent said axially rotating cigars on said conveyor means for drying the paste on said cigars, (g) an orienting means situated adjacent said delivery point for orienting said cigars to cause the head ends thereof to assume a preferred position;

(h) a pneumatic conveyor duct connected at one end to said orienting means to receive said oriented cigars therefrom and to convey said cigars to the other end of said duct;

(i) a plurality of concurrently operating distributing manifolds, each one respectively corresponding to one of said groups of cigar conveyor machines, each distributing manifold having:

(j) a central chamber in communication with a source of subatmospheric, fluid pressure;

(k) a plurality of pneumatic duct terminations in communication with said chamber, each one said ejecting means and adapted to be opened by the ejection of said cigars through said ejecting means to admit ambient air through said ejecting means to decelerate said cigars;

(o) a plurality of arresting means, one for each of said terminations, each comprising a resilient shock absorbing means respectively in axial alignment with said ejecting means and suitably axially spaced therefrom for arresting the motion of said cigars propelled through said duct, said termination, said guiding means, said ejecting means and said decelerating means;

(p) and a plurality of concurrently operating delivery conveyors, one for each of said distributing manifolds, respectively positioned adjacent thereto, each comprising a suitable supported endless belt having transversely disposed pockets adapted to receive said ejected cigars from said arresting means of said respective distributing manifolds and to deliver said cigars to a succeeding processing stage;

(q) whereby the outputs of said plurality of groups of cigar making machines are dried and oriented, the outputs from each said group of machines are conveyed to and are combined in a respectively related one of said distributing manifolds, and the said combined cigars from each of said manifolds are directed to its said respectively related one of said plurality of delivery conveyors.

References Cited

UNITED STATES PATENTS

| | | | |
|---|---|---|---|
| 2,276,962 | 3/1942 | Granstelt | 131—25 |
| 2,575,426 | 11/1951 | Parnell. | |
| 2,737,955 | 3/1956 | Riegger | 131—25 |
| 3,172,411 | 3/1965 | Cain et al. | 131—79 |

HUGH R. CHAMBLEE, *Primary Examiner.*